(12) United States Patent
Kenney

(10) Patent No.: US 11,605,826 B2
(45) Date of Patent: Mar. 14, 2023

(54) FUEL CELL VALVE CONFIGURATION

(71) Applicant: DOOSAN FUEL CELL AMERICA, INC., South Windsor, CT (US)

(72) Inventor: James Kenney, Reno, NV (US)

(73) Assignee: HYAXIOM, INC., East Hartford, CT (US)

( * ) Notice: Subject to any disclaimer, the term of this patent is extended or adjusted under 35 U.S.C. 154(b) by 398 days.

(21) Appl. No.: 16/716,889

(22) Filed: Dec. 17, 2019

(65) Prior Publication Data

US 2021/0184237 A1 Jun. 17, 2021

(51) Int. Cl.
| | | |
|---|---|---|
| *H01M 8/04746* | (2016.01) | |
| *H01M 8/04223* | (2016.01) | |
| *H01M 8/04082* | (2016.01) | |

(52) U.S. Cl.
CPC ... *H01M 8/04753* (2013.01); *H01M 8/04208* (2013.01); *H01M 8/04231* (2013.01)

(58) Field of Classification Search
CPC ......... H01M 8/04753; H01M 8/04208; H01M 8/04231; H01M 8/04228; H01M 8/04955; H01M 8/04089; Y02E 60/50
See application file for complete search history.

(56) References Cited

U.S. PATENT DOCUMENTS

| | | |
|---|---|---|
| 3,935,028 A | 1/1976 | Strasser et al. |
| 5,441,821 A | 8/1995 | Merritt et al. |
| 6,365,291 B1 * | 4/2002 | Margiott .......... H01M 8/04022 429/442 |
| 6,395,414 B1 | 5/2002 | Clingerman et al. |
| 7,297,427 B2 | 11/2007 | Kurosaki et al. |
| 7,901,815 B2 | 3/2011 | Wood |
| 8,053,128 B2 | 11/2011 | Mergler et al. |
| 2005/0031922 A1 | 2/2005 | Clingerman et al. |

FOREIGN PATENT DOCUMENTS

| | | |
|---|---|---|
| EP | 1 271 680 B1 | 12/2008 |
| JP | 2005158555 A | 6/2005 |
| JP | 2008218072 A | 9/2008 |
| JP | 2008226513 A | 9/2008 |
| KR | 101245766 B1 | 3/2013 |

OTHER PUBLICATIONS

International Search Report and Written Opinion of the International Searching Authority for International application No. PCT/US2020/064467 dated Mar. 23, 2021.
International Preliminary Report on Patentability for International application No. PCT/US2020/064467 dated Jun. 30, 2022.

\* cited by examiner

*Primary Examiner* — Muhammad S Siddiquee
(74) *Attorney, Agent, or Firm* — Carlson, Gaskey & Olds, P.C.

(57) ABSTRACT

An illustrative example fuel cell reactant flow control valve assembly includes a pneumatic valve configured to allow reactant flow when the pneumatic valve is in an open condition and to prevent reactant flow when the pneumatic valve is in a closed condition. A control valve selectively allows a pressure of the reactant to provide pneumatic pressure to maintain the pneumatic valve in the open condition. The control valve selectively vents the pneumatic pressure reservoir to control a rate at which the pneumatic pressure decreases and a rate at which the pneumatic valve changes from the open condition to the closed condition.

12 Claims, 2 Drawing Sheets

FUEL CELL VALVE CONFIGURATION

BACKGROUND

Fuel cells generate electricity based on an electrochemical reaction. Fuel cell power plants typically include many fuel cells arranged in stacks referred to as cell stack assemblies. There are various challenges associated with operating a fuel cell power plant.

One challenge is regulating or controlling reactant flow to the cell stack assembly during start up and shut down conditions. For example, it is desirable to maintain at least some fluid flow to at least some portions of the stack during shut down to purge reactant gas from the fuel cells. A variety of techniques and component arrangement have been proposed to address that concern. Some previous proposals introduce additional cost or complication and either of those is undesirable.

SUMMARY

An illustrative example fuel cell reactant flow control valve assembly includes a pneumatic valve configured to allow reactant flow when the pneumatic valve is in an open condition and to prevent reactant flow when the pneumatic valve is in a closed condition. A control valve selectively allows a pressure of the reactant to provide pneumatic pressure to maintain the pneumatic valve in the open condition. The control valve selectively vents the pneumatic pressure reservoir to control a rate at which the pneumatic pressure decreases and a rate at which the pneumatic valve changes from the open condition to the closed condition.

An embodiment having one or more features of the fuel cell reactant flow control valve of the previous paragraph includes a pressure reservoir associated with the control valve. The pressure reservoir provides the pneumatic pressure based on being pressurized by the pressure of the reactant.

In an embodiment having one or more features of the fuel cell reactant flow control valve of any of the previous paragraphs, the pressure reservoir is coupled to an actuator of the pneumatic valve. The actuator of the pneumatic valve includes a piston that is biased in a first direction to urge the pneumatic valve into the closed condition, and the pneumatic pressure of the reservoir moves the piston in a second direction to urge the pneumatic valve into the open condition.

In an embodiment having one or more features of the fuel cell reactant flow control valve of any of the previous paragraphs, the control valve has a first condition that allows pressurized reactant to flow into the pressure reservoir. The control valve has a second condition that isolates the pressure reservoir from the pressurized reactant and vents pressurized reactant from the pressure reservoir.

In an embodiment having one or more features of the fuel cell reactant flow control valve of any of the previous paragraphs, the rate at which the pneumatic valve changes from the open condition to the closed condition depends on a flow rate of the second condition of the control valve.

An embodiment having one or more features of the fuel cell reactant flow control valve of any of the previous paragraphs includes a supply conduit configured to carry reactant. The pneumatic valve is situated to control whether reactant flows through the supply conduit to a fuel cell. The control valve is coupled to a branch of the supply conduit upstream of the pneumatic valve.

An illustrative example embodiment of a fuel cell power plant includes a cell stack assembly having a plurality of fuel cells, a manifold configured to distribute fluid to the cell stack assembly, a pressurized source of reactant fluid, a supply conduit coupling the pressurized source of reactant fluid to the manifold, and a pneumatic valve between the pressurized source of reactant fluid and the manifold, the pneumatic valve having an open condition that allows reactant fluid to flow to the manifold and a closed condition that prevents reactant fluid from flowing to the manifold. A pressure reservoir receives pressurized reactant fluid from the pressurized source of reactant fluid, the pressure reservoir providing pneumatic pressure to maintain the pneumatic valve in the open condition and a control valve between the pressurized source of reactant fluid and the pressure reservoir, the control valve selectively isolating the pressure reservoir from the pressurized source of reactant fluid and controlling a rate of release of the pneumatic pressure from the pressure reservoir to thereby control a rate at which the pneumatic valve moves from the open condition into the closed condition.

In an embodiment having one or more features of the fuel cell power plant of the previous paragraph, the pneumatic valve includes an actuator. The actuator of the pneumatic valve includes a piston that is biased in a first direction to urge the pneumatic valve into the closed condition. The pressure reservoir is coupled to the actuator of the pneumatic valve and the pneumatic pressure of the pressure reservoir moves the piston in a second direction to urge the pneumatic valve into the open condition.

In an embodiment having one or more features of the fuel cell power plant of any of the previous paragraphs, the control valve has a first condition that allows the pressurized reactant to flow into the pressure reservoir. The control valve has a second condition that isolates the pressure reservoir from the pressurized reactant and the second condition of the control valve vents the pressurized reactant from the pressure reservoir.

In an embodiment having one or more features of the fuel cell power plant of any of the previous paragraphs, the rate at which the pneumatic valve changes from the open condition to the closed condition depends on a pressure reservoir venting flow rate of the second condition of the control valve.

An illustrative example method of controlling operation of a fuel cell power plant includes opening a pneumatic valve using pneumatic pressure of pressurized fuel cell reactant, allowing the pressurized fuel cell reactant to flow through the pneumatic valve to a cell stack assembly, determining that shutdown of the cell stack assembly is desired, and control a rate that the pneumatic valve closes by controlling a rate of release of the pneumatic pressure.

An embodiment having one or more features of the method of the previous paragraph includes delivering at least some of the pressurized fuel cell reactant to a pressure reservoir and using pressure in the pressure reservoir as the pneumatic pressure for opening the pneumatic valve.

An embodiment having one or more features of the method of any of the previous paragraphs includes isolating the pressure reservoir from a source of the pressurized fuel cell reactant in response to determining that shutdown of the cell stack assembly is desired and venting the fuel cell reactant from the pressure reservoir at a rate that controls the rate that the pneumatic valve closes.

Various features and advantages of at least one disclosed example embodiment will become apparent to those skilled in the art from the following detailed description. The drawings that accompany the detailed description can be briefly described as follows.

DETAILED DESCRIPTION

Figure 1:
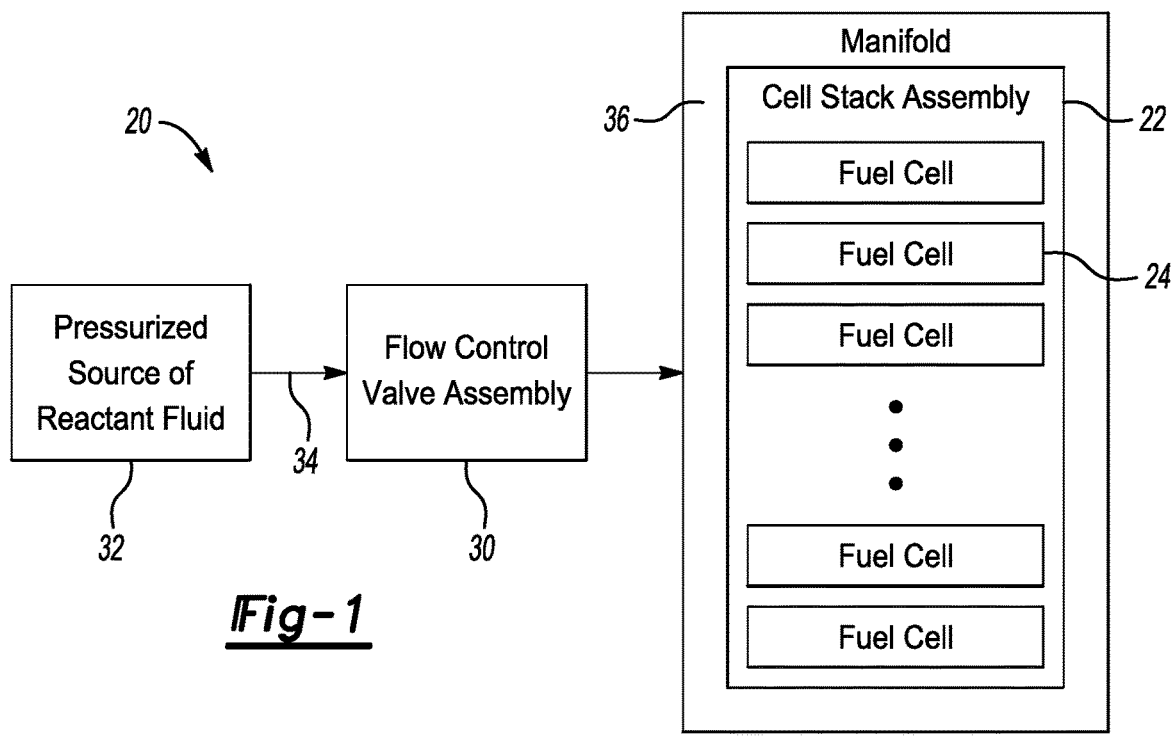
FIG. 1 schematically illustrates selected portions of a fuel cell power plant including a valve assembly designed according to an example embodiment.

FIG. 1 schematically illustrates selected portions of a fuel cell power plant 20. A cell stack assembly 22 includes a plurality of fuel cells 24 that operate in a known manner for generating electricity. A flow control valve assembly 30 controls a flow of at least one reactant to the fuel cells 24 by controlling whether reactant from a pressurized source of reactant fluid 32 flows along a supply conduit 34 to a manifold 36 that is configured to distribute the reactant to appropriate portions of the fuel cells 24.

In the illustrated example, the pressurized source of reactant fluid 32 supplies pressurized hydrogen for the electrochemical reaction within the fuel cells 24. In the illustrated example, the fluid flow along the supply conduit 34 includes pressurized nitrogen under at least some circumstances. Nitrogen is useful, for example, during a shutdown of the cell stack assembly 22. Nitrogen is useful for purging excess reactant hydrogen from the fuel cells 24 during a shutdown.

Figure 2:
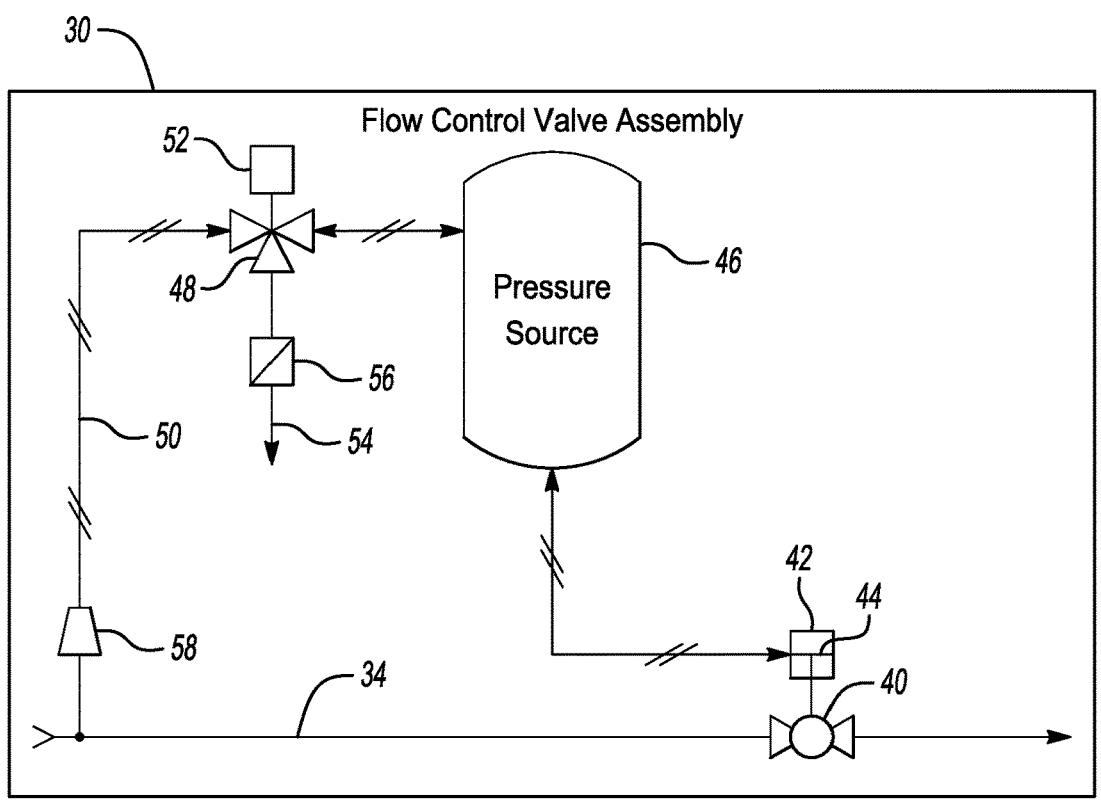
FIG. 2 schematically illustrates selected features of an example embodiment valve assembly.

FIG. 2 schematically illustrates an example configuration of the flow control valve assembly 30. A pneumatic valve 40 is situated to selectively allow pressurized reactant to flow along the supply conduit 34 from the pressurized source of reactant fluid 32 to the manifold 36. The pneumatic valve 40 includes an actuator 42 that controls whether the pneumatic valve 40 is in an open condition or a closed condition. The example actuator 42 includes a piston 44 that is biased in a first direction to urge the pneumatic valve 40 into the closed position. A pressure reservoir 46 receives pressurized reactant fluid (e.g., gas) and provides pneumatic pressure to the actuator 42 to urge the piston 44 in a second direction that maintains the pneumatic valve 40 in the open condition.

A control valve 48 selectively allows pressurized reactant to flow through a branch 50 of the supply conduit 34 to the pressure reservoir 46. A valve controller 52 controls the position or condition of the control valve 48 to selectively allow pressurized reactant into the pressure reservoir 46. For example, during a start up procedure the pneumatic valve 40 initially will be biased into the closed position. The control valve 48 allows pressurized reactant to flow into the pressure reservoir 46 until sufficient pressure is built up to provide adequate pneumatic pressure to the actuator 42 to open the pneumatic valve 40. During operation of the fuel cell power plant 20, the valve controller 52 selectively allows additional pressurized reactant into the pressure reservoir 46 or isolates the pressure reservoir 46 from additional pressurized reactant. The pneumatic pressure in the pressure reservoir 46 is kept at a level sufficient to operate the pneumatic valve 40.

When a shutdown of the cell stack assembly 22 is desired, the valve controller 52 causes the control valve 48 to close off the branch 50 of the supply conduit 34 so that no additional pressurized reactant flows toward the pressure reservoir 46. The control valve 48 allows pressurized reactant to be released from the pressure reservoir 46 through a vent 54. The illustrated example includes a filter 56 associated with the vent 54 for protecting the control valve 48, for example. The rate at which the control valve 48 allows pressure to be released from the pressure reservoir 46 and the size or volume of the pressure reservoir 46 controls the rate at which the actuator 42 closes the pneumatic valve 40.

Figure 3:
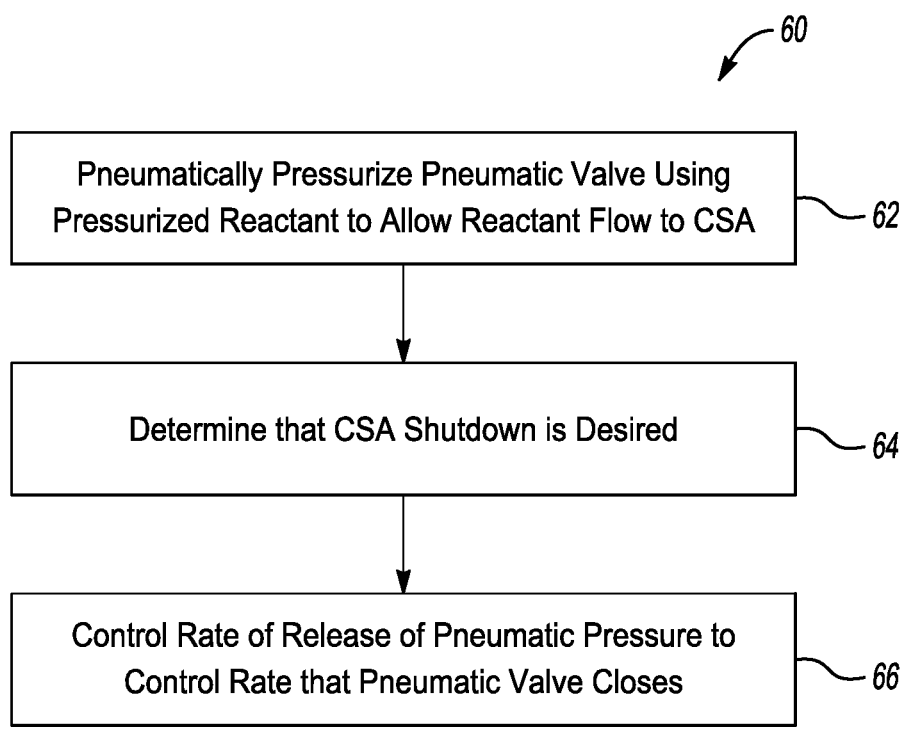
FIG. 3 is a flow chart diagram summarizing an example control strategy.

FIG. 3 includes a flow chart diagram 60 that summarizes an example control approach. At 62, the pneumatic valve 40 is pneumatically pressurized using pressurized reactant to allow reactant flow to the cell stack assembly 22. At 64, a determination is made that shutdown of the cell stack assembly 22 is desired. At 66, the control valve 48 controls a rate of release of pneumatic pressure to control the rate at which the pneumatic valve 40 closes.

The illustrated flow control valve assembly allows for controlling the rate of release of pneumatic pressure used for maintaining the pneumatic valve 40 in the open condition to control the rate that the pneumatic valve 40 closes. The illustrated arrangement allows for using the pressurized reactant to open the pneumatic valve 40 and to allow for some continued flow through the pneumatic valve 40 during a shutdown procedure. The pneumatic pressure from the pressure reservoir 46, which is based on the pressurized reactant, can be selectively released over a desired period of time to allow continued nitrogen flow through the pneumatic valve 40 to achieve desired shutdown conditions within the cell stack assembly 22. In some examples the pneumatic valve 40 remains open for several minutes after reactant flow ceases as part of the shutdown procedure.

The illustrated example embodiment allows for controlling reactant flow within a fuel cell power plant in an efficient and effective manner. The flow control valve assembly does not require additional electrical power and utilizes pressure already available within the fuel cell power plant for purposes of controlling the condition of the pneumatic valve 40 for selectively controlling the flow of reactant, a purge gas such as nitrogen, or both, to the cell stack assembly 22.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell reactant flow control valve assembly, comprising:
    a pneumatic valve configured to allow pressurized fluid flow including at least one of a reactant and a purge gas when the pneumatic valve is in an open condition and to prevent pressurized fluid flow when the pneumatic valve is in a closed condition; and
    a control valve that selectively allows a pressure of the pressurized fluid to provide pneumatic pressure to maintain the pneumatic valve in the open condition, the control valve selectively reducing the pneumatic pressure to control a rate at which the pneumatic pressure decreases and a rate at which the pneumatic valve changes from the open condition to the closed condition, wherein the rate at which the pneumatic valve changes from the open condition to the closed condition allows at least some of the pressurized fluid including the purge gas to flow through the pneumatic valve during a shutdown procedure.

2. The fuel cell reactant flow control valve assembly of claim 1, comprising a pressure reservoir associated with the control valve, the pressure reservoir providing the pneumatic pressure based on being pressurized by the pressure of the pressurized fluid.

3. The fuel cell reactant flow control valve assembly of claim 2, wherein
the pressure reservoir is coupled to an actuator of the pneumatic valve;
the actuator of the pneumatic valve includes a piston that is biased in a first direction to urge the pneumatic valve into the closed condition; and
the pneumatic pressure of the reservoir moves the piston in a second direction to urge the pneumatic valve into the open condition.

4. The fuel cell reactant flow control valve assembly of claim 2, wherein
the control valve has a first condition that allows the pressurized fluid to flow into the pressure reservoir; and
the control valve has a second condition that isolates the pressure reservoir from the pressurized fluid and vents pressurized fluid from the pressure reservoir.

5. The fuel cell reactant flow control valve assembly of claim 4, wherein the rate at which the pneumatic valve changes from the open condition to the closed condition depends on a flow rate of the second condition of the control valve.

6. The fuel cell reactant flow control valve assembly of claim 4, comprising a supply conduit configured to carry the reactant and wherein
the pneumatic valve is situated to control whether the reactant flows through the supply conduit to a fuel cell, and
the control valve is coupled to a branch of the supply conduit upstream of the pneumatic valve.

7. A fuel cell power plant, comprising:
a cell stack assembly including a plurality of fuel cells;
a manifold configured to distribute fluid to the cell stack assembly;
a pressurized source of pressurized fluid including at least one of a reactant and a purge gas;
a supply conduit coupling the pressurized source of pressurized fluid to the manifold;
a pneumatic valve between the pressurized source of pressurized fluid and the manifold, the pneumatic valve having an open condition that allows the pressurized fluid to flow to the manifold and a closed condition that prevents the pressurized fluid from flowing to the manifold;
a pressure reservoir that receives the pressurized fluid from the pressurized source of pressurized fluid, the pressure reservoir providing pneumatic pressure to maintain the pneumatic valve in the open condition; and
a control valve between the pressurized source of pressurized fluid and the pressure reservoir, the control valve selectively isolating the pressure reservoir from the pressurized source of pressurized fluid and controlling a rate of release of the pneumatic pressure from the pressure reservoir during a shutdown procedure to thereby control a rate at which the pneumatic valve moves from the open condition into the closed condition, wherein the rate at which the pneumatic valve moves from the open condition to the closed condition allows at least some of the pressurized fluid including the purge gas to flow through the pneumatic valve during the shutdown procedure.

8. The fuel cell power plant of claim 7, wherein
the pneumatic valve includes an actuator;
the actuator of the pneumatic valve includes a piston that is biased in a first direction to urge the pneumatic valve into the closed condition;
the pressure reservoir is coupled to the actuator of the pneumatic valve; and
the pneumatic pressure of the pressure reservoir moves the piston in a second direction to urge the pneumatic valve into the open condition.

9. The fuel cell power plant of claim 7, wherein
the control valve has a first condition that allows the pressurized fluid to flow into the pressure reservoir;
the control valve has a second condition that isolates the pressure reservoir from the pressurized fluid; and
the second condition of the control valve vents the pressurized fluid from the pressure reservoir.

10. The fuel cell power plant of claim 9, wherein the rate at which the pneumatic valve changes from the open condition to the closed condition depends on a pressure reservoir venting flow rate of the second condition of the control valve.

11. The fuel cell power plant of claim 9, wherein the purge gas comprises nitrogen.

12. The fuel cell reactant flow control valve assembly of claim 1, wherein the purge gas comprises nitrogen.

* * * * *